US005241392A

United States Patent [19]

Mosley et al.

[11] Patent Number: 5,241,392

[45] Date of Patent: Aug. 31, 1993

[54] LIQUID CRYSTAL DISPLAY

[75] Inventors: Alan Mosley, Berkhamsted; Patrick C. Rundle, Ruislip, both of England

[73] Assignee: Gec-Marconi Limited, England

[21] Appl. No.: 779,030

[22] Filed: Oct. 18, 1991

[30] Foreign Application Priority Data

Oct. 24, 1990 [GB] United Kingdom ................ 9023133

[51] Int. Cl.[5] ................................ H04N 5/70

[52] U.S. Cl. ................................ 358/236; 340/784

[58] Field of Search ................................ 358/236, 241, 59; 340/784

[56] References Cited

U.S. PATENT DOCUMENTS

| | | | |
|---|---|---|---|
| 4,455,576 | 6/1984 | Hoshi | 358/241 |
| 4,635,127 | 1/1987 | Togashi | 358/236 |
| 4,789,899 | 12/1988 | Takahashi | 358/236 |
| 5,038,139 | 8/1991 | Fujisawa | 340/784 |

FOREIGN PATENT DOCUMENTS 0287055 10/1988 European Pat. Off. .

OTHER PUBLICATIONS

Liquid Crystal Matrix Displays, by Bernard J. Lechner, et al., Proceedings Of The IEEE, vol. 59, No. 11, Nov. 1971, pp. 1566–1579.

*Primary Examiner*—Tommy Chin

*Attorney, Agent, or Firm*—Kirschstein, Ottinger, Israel & Schiffmiller

[57] ABSTRACT

In a method of driving liquid crystal cells in an active matrix addressed display of the resistively-coupled transistor type whereby interlacing of alternate rows of pixels is achieved, rows N−1, N+1, N+3, - - - of the cells are addressed in sequence in a first field period by applying transistor turn-on pulses to the associated row address lines while reference signals are applied to the row address lines associated with rows, N, N+2, N+4, - - - in sequence, the turn-on pulse for the row N−1 and the reference signal for the row N being coincident. During a second field period of the transistor turn-on pulses are applied to the address lines for rows N, N+2, N+4, - - - while reference signals are applied to the address lines for rows N−1, N+3, N+5, - - - the turn-on pulse for the row N and the reference signal for the row N+1 being coincident. The reference signal may be of two different magnitudes which alternate at the line rate or at the frame rate of a television video signal.

3 Claims, 5 Drawing Sheets

FIG. 3(a)
PRIOR ART
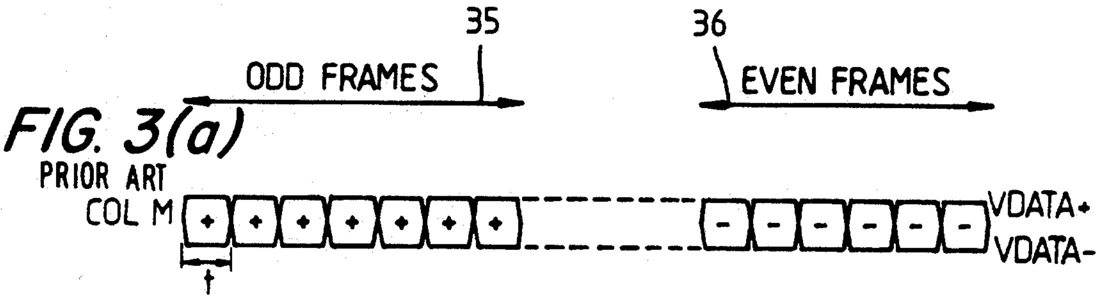
FIG. 3(b)
PRIOR ART
FIG. 3(c)
PRIOR ART
FIG. 3(d)
PRIOR ART
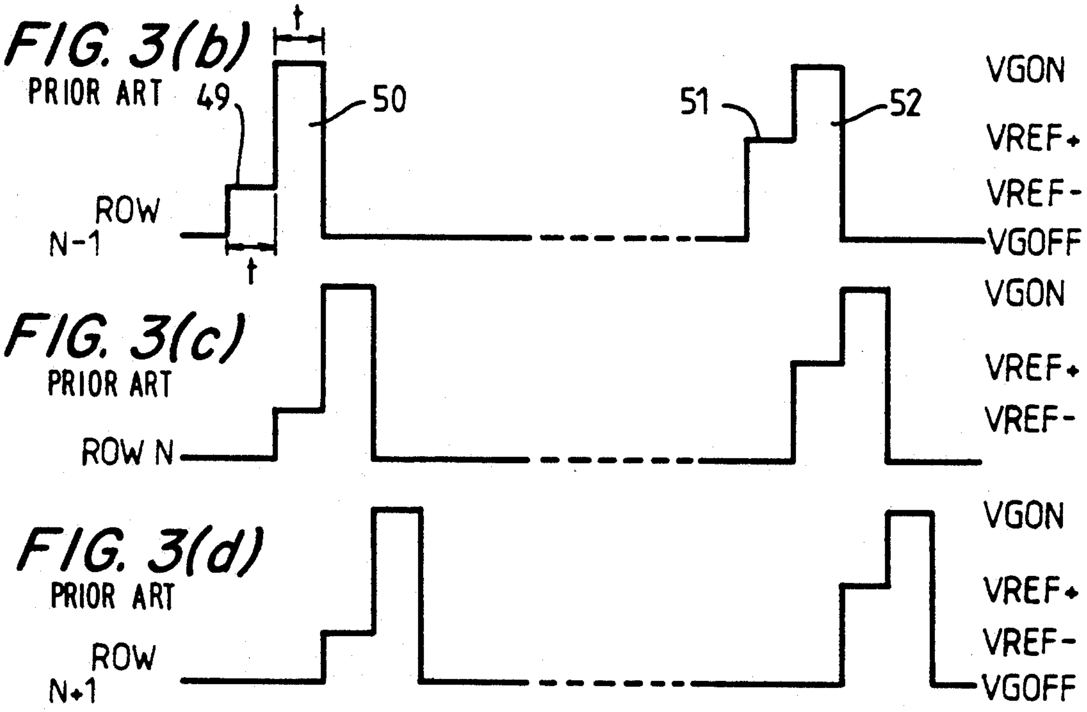

35
36
ODD FRAMES
EVEN FRAMES

COL M
VDATA+
VDATA-
t t
53
54
55
56
ROW N-1
VGON
VREF+
VREF-
VGOFF
t
57
58
59
60

ROW N
VGON
VREF+
VREF-
VGOFF

ROW N+1
VGON
VREF+
VREF-
VGOFF 61
62
ODD FIELDS
EVEN FIELDS

COL M
VDATA+
VDATA-
t
t 63
64
t
ROW N-1
VGON
VREF+
VREF-
VGOFF 65
66
ROW N
VGON
VREF+
VREF-
VGOFF 67
68
ROW N+1
VGON
VREF+
VREF-
VGOFF 69
70
ROW N+2
VGON
VREF+
VREF-
VGOFF 71
72
ROW N+3
VREF+
VREF-
VGOFF

LIQUID CRYSTAL DISPLAY

BACKGROUND OF THE INVENTION

1. Field of the Invention

This invention relates to liquid crystal displays, and particularly to a method of driving the elements in an active matrix addressed liquid crystal display (LCD).

2. Description of Related Art

Active matrix addressed LCDs are widely used in pocket television receivers for the display of broadcast television programmes. In addition, such displays are leading contenders for use in further large-area television systems.

A major problem which arises in the manufacture of current active matrix LCDs is low yield due to the complexity of their structures.

United Kingdom Patent Application No. 8926960.9 discloses an arrangement in which the level of complexity is reduced by using a resistively-coupled transistor (RCT) architecture. Previously-proposed drive schemes for the RCT architecture do not provide for interlacing of the lines of a frame in a television picture.

SUMMARY OF THE INVENTION

It is an object of the present invention to provide a drive scheme for the RCT architecture which allow interlacing of the lines.

According to the invention there is provided a method of driving liquid crystal cells in an active matrix addressed liquid crystal display of the resistively-coupled transistor type, wherein during a first field period rows N−1, N+1, N+3, - - - of the cells are addressed in sequence by applying transistor turn-on pulses to the associated row address lines, while reference signal are applied to the row address lines associated with rows, N, N+2, N+4, - - - in sequence, the turn-on pulse for the row N−1 and the reference signal for the row N being coincident; and wherein during a second field period the rows, N, N+2, N+4, - - - of the cells are addressed in sequence by applying transistor turn-on pulses to the associated row address lines, while reference signals are applied to the row address lines associated with rows N−1, N+3, N+5, - - - in sequence, the turn-on pulse for the row N and the reference signal for the row N+1 being coincident.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

Figure 1:
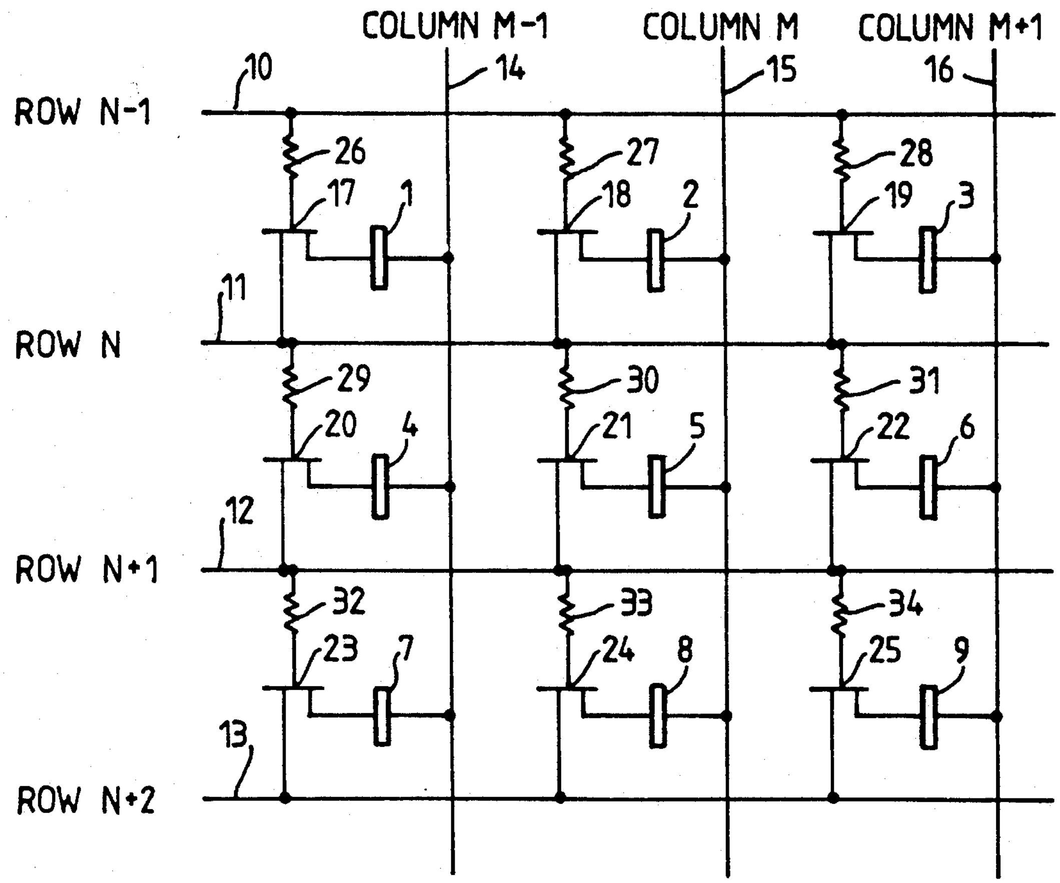
FIG. 1 PRIOR ART
FIG. 1 is a circuit diagram of the RCT architecture drive circuit for a group of liquid crystal cells in an active matrix addressed LCD, the prior art FIGS. 2(*a*), 2(*b*), 2(*c*), 2(*d*), 3(*a*), 3(*b*), 3(*c*), 3(*d*), 4(*a*), 4(*b*), 4(*c*) and 4(*d*), show cell addressing waveforms in previous prior arts drive schemes which do not allow for interlacing of lines, and FIGS. 5(*a*), 5(*b*), 5(*c*), 5(*d*), 5(*e*) and 5(*f*) shows waveforms in a drive scheme according to the present invention.
Figure 2A:
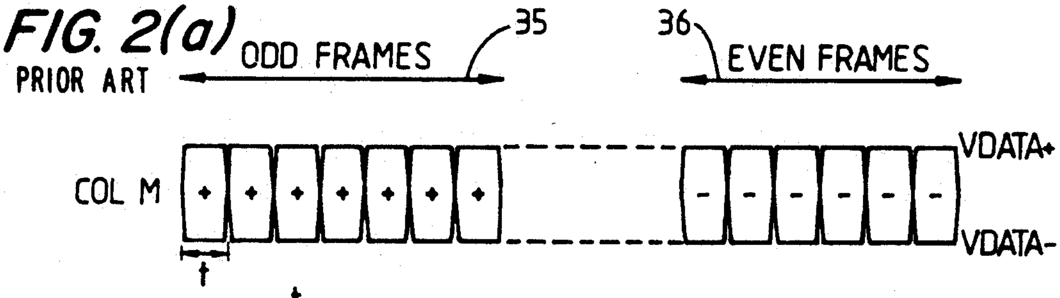
FIG. 2(a) PRIOR ART
Figure 2B:
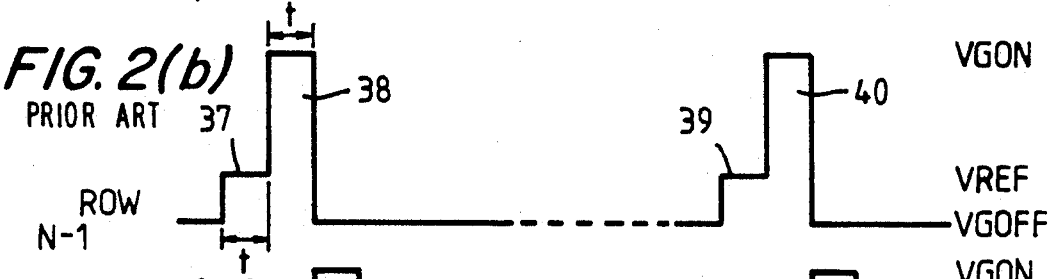
FIG. 2(b) PRIOR ART
Figure 2C:
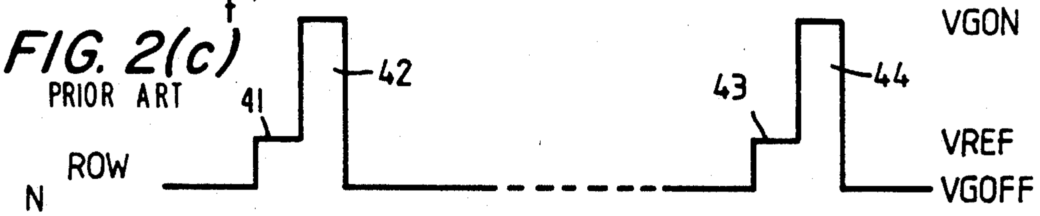
FIG. 2(c) PRIOR ART
Figure 2D:
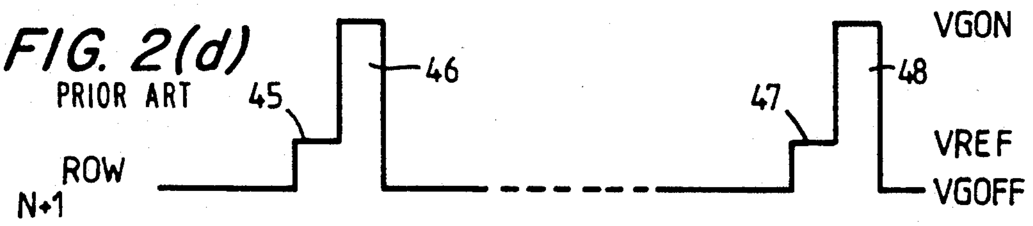
FIG. 2(d) PRIOR ART

Referring to FIG. 1 of the drawings, a group of liquid crystal cells 1-9 forming part of an active matrix addressed LCD is addressed by row address lines 10, 11, 12 and 13 column address lines 14, 15 and 16. One plate of each cell is connected directly to its column address line, and the other plate of the cell is connected to a main electrode (source of drain) of a respective field effect transistor 17-25. The other main electrode of each transistor is connected directly to the row address line for the respective cell. The gate electrode of each transistor 17-25 is connected via a respective gate resistor 26-34 to the row address line above. For example, the cell 5 is driven by data pulses from the column address line 15 (Column M address line) and by a strobe pulse from the line 11 (Row N address line) and a reference level from the line 12 (Row N+1 address line).

FIG. 2 shows a set of waveforms for the cells 1-9 in one form of a previous prior art drive scheme. Data pulses applied to the Column M address line 15 are shown in FIG. 2(*a*), a group of data pulses 35 being applied, as required, during odd frames of the video signal and a group 36 during even frames. The data pulses comprise either a $V_{DATA+}$ or a $V_{DATA-}$ level depending upon whether or not a data item is present, and the significance of these levels reverses for alternate frames, as indicated by the + and − signs in FIG. 2(*a*). Each data pulse is of duration t. Pulses applied to the Row N−1 address lien 10 are shown in FIG. 2(*b*). These comprise a reference level 37 of voltage $V_{REF}$ and of duration t, immediately followed by a gate turn-on pulse 38 of amplitude $V_{GON}$ and of duration t, occurring during an odd frame period. The pulse 38 is temporally aligned with a data pulse on the Column M address line 15. Similar reference and strobe pulses 39, 40 are applied to the address line 10 during an even frame period.

Reference and gate turn-on pulses 41 and 42, 43 and 44 (FIG 2(*c*)) are applied to the Row N address lien 11, but at a time t later than the corresponding pulses on the line 10. Similarly, reference and gate turn-on pulses 45 and 46, 47 and 48 (FIG. 2(*d*)) are applied to the Row N+1 a address lien 12, but at a time t later than the corresponding pulses on the line 11.

FIG. 3 shows an prior art drive scheme in which a reference pulse 49 of amplitude $V_{REF-}$ (FIG. 3(*a*)) followed by a gate turn-on pulse 50 of amplitude $V_{GON}$ is applied to the Row N−1 address line 10 during an odd frame, whereas a reference pulse 51 of amplitude $V_{REF+}$, larger than $V_{REF+}$, followed by a gate turn-on pulse 52 similar to the pulse 50, is applied to the line 10 during an even frame period. Similar pulses (FIG. 3(*b*) and 3(*c*) respectively) are applied to the Row N and Row N+1 lines 11, 12 but at times t and 2t, respectively, later than those applied to the line 10.

Figures 4A, 4B, 4C, 4D:
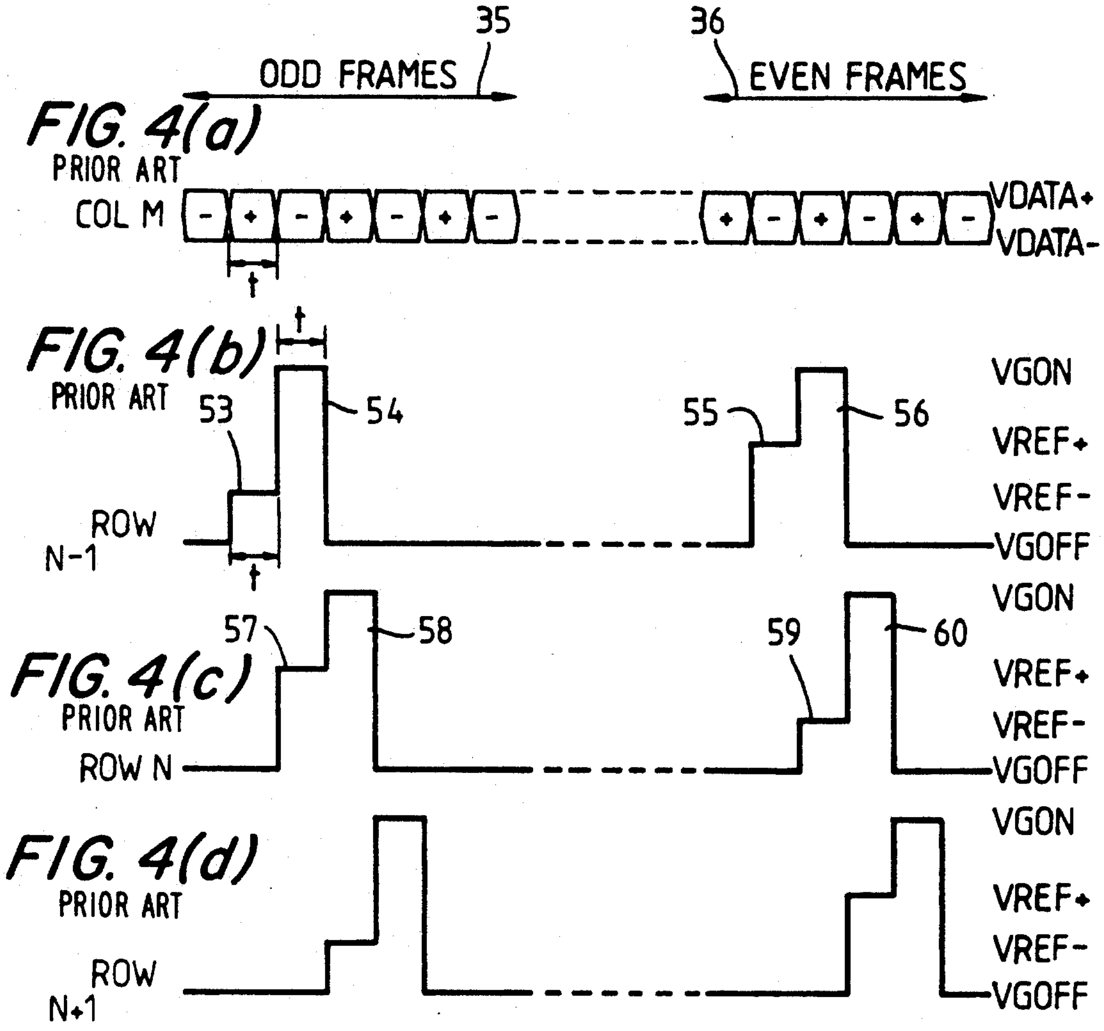
FIG. 4(a) PRIOR ART
FIG. 4(b) PRIOR ART
FIG. 4(c) PRIOR ART
FIG. 4(d) PRIOR ART

FIG. 4 shows a further prior art drive scheme in which pulses 53 and 54, 55 and 56 (FIG. 4(*a*)), similar to the pulses 49 and 50, 51 and 52 of FIG. 3(*a*), are applied to the line 10 and similar pulses are applied to the line 12, whereas reference pulses 57 and 59 applied to the line 11 have the reverse amplitudes, $V_{REF+}$ and $V_{REF-}$, respectively. Pulses applied to other successive row address lines in the matrix will alternate correspondingly.

Each of the previous drive schemes described with reference to FIGS. 2, 3 and 4 suffer from certain disadvantages. It will be seen that the Row N+1 address line provides the reference voltage for the Row N devices when the gates of the latter row are being addressed, and so on for successive rows through the matrix. The reference signal for the Row N partially turns on the transistors for the Row N+1. This does not present too great a problem, however, as the Row N+1 transistors are around to be addressed next. A more serious problem with the previously schemes is the effect of the gate addressing pulse, typically +15 to 20 volts, on the transistors in the preceding row, i.e. Row N−1 if Row N is being addressed. In this case a negative voltage pulse is effectively applied to the transistor gates of Row N−1 (see, for example, FIG. 2), and this will cause those transistors to turn on and will therefore lead to corruption of the data displayed by the Row N−1 pixels. This effect is known as "kickback".

Figures 5A, 5B, 5C, 5D, 5E, 5F:
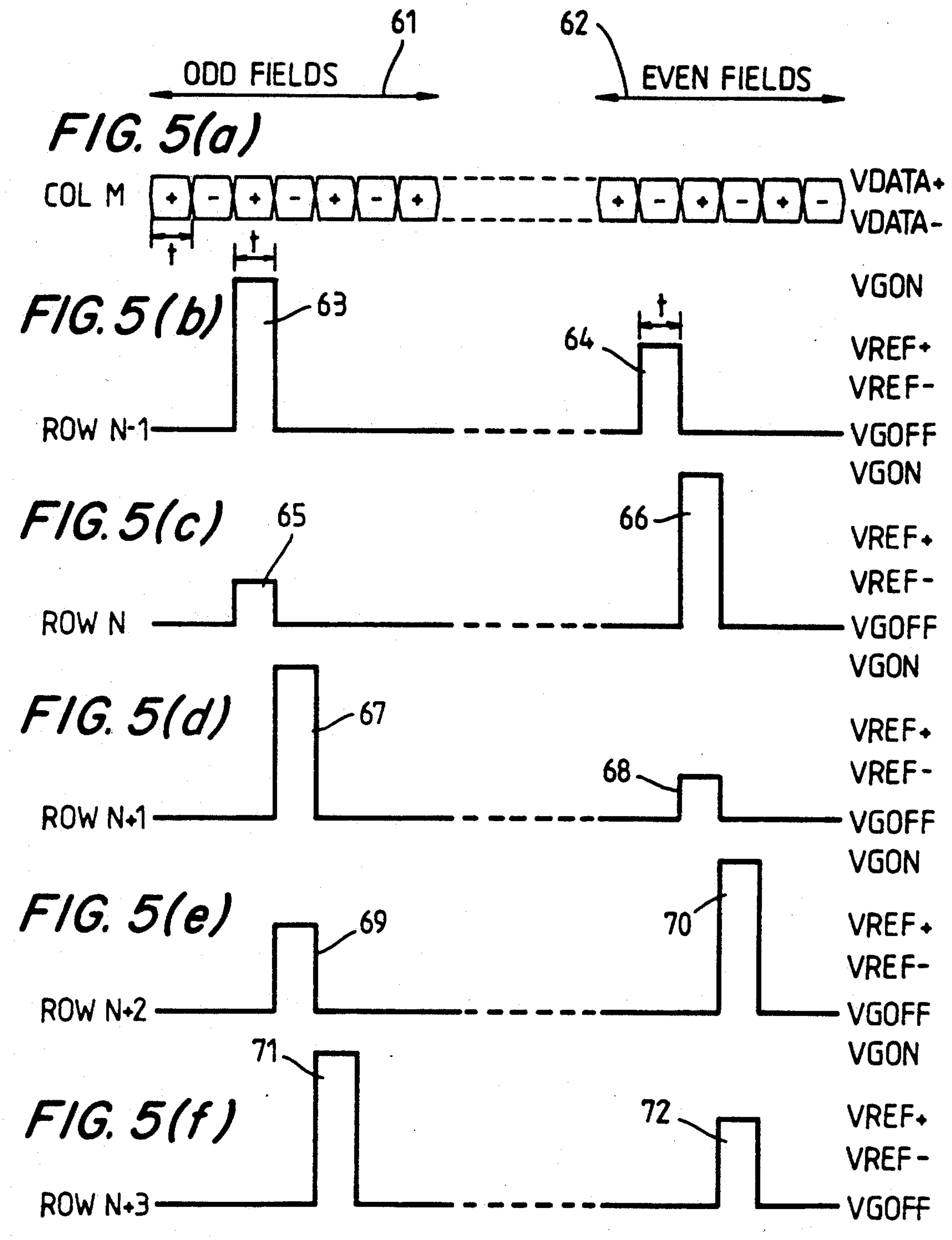

FIG. 5 shows waveforms in a drive scheme according to the present invention. In this case, FIG. 5(*a*) shows data pulses applied during odd field (sub-frame) periods 61 and even field periods 62. The pulses fed to the Row N−1 line 10 (FIG. 5(*b*)) comprise a gate turn-on pulse 63 in odd field periods and a reference pulse 64 of amplitude $V_{REF+}$ in even field periods. Each pulse is of duration t and is temporarily aligned with a data pulse. The pulses applied to Row N (FIG. 5(*c*)) comprise a reference pulse 65 of amplitude $V_{REF-}$ coincident with the pulse 63 in the odd field period and a gate turn-on pulse 66 in the even field period, $V_{REF+}$ being larger than $V_{REF-}$. The latter pulse is delayed by a period t relative to the pulse 64. The Row N+1 pulses (FIG. 5(*d*)) comprise a gate turn on pulse 67 in the odd field period, delayed by a period t relative to the pulse 65 and a reference pulse 68 of amplitude $V_{REF-}$ in the even field period, coincident with the pulse 66. The Row N+2 pulses (FIG. 5(*e*)) comprise a reference pulse 69 of amplitude $V_{REF+}$ in the odd field period, coincident with the pulse 67, and a gate turn-on pulse 70 in the even field period, delayed by a period t relative to the pulse 68. The pulses for Row N+3 (FIG. 5(*f*)) comprise a gate turn-on pulse 71 in the odd field period, delayed by a period t relative to the pulse 69 and a reference pulse 72 of amplitude $V_{REF+}$ in the even field period, coincident with the pulse 70.

this scheme therefore addresses in the first field period the Rows N−1, N+1 and N+3, etc. in sequence at periods t apart, whereas the alternate rows, i.e. Rows N, N+2, etc., provide the reference signals. In the next field period, the rows N, N+2, etc. are addressed in sequence, while the rows N−1, N+1, N+3, etc. provide the reference signals. An extra row address line will be need for the last row of the display, but this line will not require any transistors.

The pixels of the addressed rows will maintain their correct data levels for a longer period than in the previous schemes, because the kickback effect will occur only in the next field period. This will lead merely to a softening of sharp edges in the displayed image, which can be beneficial to the viewer. A similar effect will be produced by the presence of the reference pulses.

In particular, it will be seen that, since the LC devices of alternate rows are switched in alternate field (subframe) periods, the resulting picture is interlaced.

In the previous drive schemes described with reference to FIGS. 2 and 4 is know that the use of constant-amplitude reference pulses (FIG. 2), alternate-amplitude reference pulses at frame rate (FIG. 3) and alternate-amplitude reference pulses at line rate (FIG. 4) each have their own relative advantages. For example, the alternating amplitude reference pulse schemes reduce the necessary amplitude of the data pulses, and alternation at line rate rather than frame rate greatly reduces flicker in the display. Although FIG. 5 shows one particular scheme, i.e. one in which the reference pulse amplitudes alternate at frame rate, the other arrangements of constant or alternating amplitude reference pulses could be equally well applied to the interlaced scheme of the present invention, and would show the same relative advantages.

We claim:

1. A method of driving liquid crystal cells in an active matrix-addressed liquid crystal display of the resistively-coupled transistor type, comprising the steps of:

(a) addressing, during a first field period, rows N−1, N+1, N+3, - - - of the liquid crystal cells, in sequence, by applying transistor turn-on pulses to row address lines associated with said rows N−1, N+1, N+3, - - - while applying reference signals to row address lines associated with rows N, N+2, N+4, - - - of the liquid crystal cells, in sequence, the transistor turn-on pulse for the row N−1 and the reference signal for the row N being coincident, N being a positive integer;

(b) addressing, during a second field period, rows N, N+2, N+4, - - - of the liquid crystal cells, in sequence, by applying the transistor turn-on pulses to the row address lines associated with said rows N, N+2, N+4, - - - while applying the reference signals to row address lines associated with rows N+1, N+3, N+5, - - - of the liquid crystal cells, in sequence, the transistor turn-on pulse for the row N and the reference signal for the row N+1 being coincident;

(c) repeating said first and second field periods alteratively; and (d) applying to the row address lines the transistor turn-in pulses and the reference signals alternately in respective alternate field periods.

2. A method as claimed in claim 1, wherein the reference signals are of two different magnitudes which alternate at the line rate of a television signal from which data pulses for driving the liquid crystal cells are derived.

3. A method as claimed in claim 1, wherein the reference signals are of two different magnitudes which alternate at the frame rate of a television signal from which data pulses for driving the liquid crystal cells are derived.

* * * * *